United States Patent Office 3,814,708
Patented June 4, 1974

---

3,814,708
VINYLIDENE CHLORIDE SERIES RESIN COMPOSITIONS
Fumiya Nagoshi and Hideyuki Arakawa, Kobe, and Kazuo Saito, Nishinomiya, Japan, assignors to Kanegafuchi Kagaku Kogyo Kabushiki Kaisha, Osaka, Japan
No Drawing. Filed Dec. 7, 1972, Ser. No. 312,978
Int. Cl. C08f 19/14, 21/04
U.S. Cl. 260—23 XA                             7 Claims

ABSTRACT OF THE DISCLOSURE

A composition consisting essentially of a vinylidene chloride series resin blended with a graft copolymer obtained by polymerizing 30 to 60 parts by weight of a monomer mixture consisting essentially of 30 to 60% by weight of an aromatic vinyl compound, 10 to 40% by weight of methyl methacrylate, 10 to 40% by weight of acrylic acid ester, and 5 to 20% by weight of acrylonitrile, in 40 to 70 parts by weight of a butadiene rubber latex.

BACKGROUND OF THE INVENTION

This invention relates to an improved vinylidene chloride series resin.

Vinylidene chloride series resins are suitable for use in food packaging. They have certain advantageous properties, such as low water vapor permeability and low gas permeability. Thus, these resins are especially suitable as food packaging materials because they can preserve foodstuffs without injury to their fragrance or flavor or degradation of their properties. However, these resins also have the following defects. No suitable modifier has yet been developed for such vinylidene chloride resins to eliminate these defects.

In order to improve processability of vinylidene chloride series resins, low molecular weight plasticizers, such as dioctyl phthalate, dibutyl sebacate, acetyltributyl citrate, ethylphthalylethyl glycolate, α-chloronaphthalene and epoxidized soybean oil, have been used. However, since each of these modifiers is not sufficiently compatible with the vinylidene chloride resin, exuding of such modifiers is frequently caused to occur in a molded article of such vinylidene chloride resin. Thus, food packaged in and having direct contact with such molded article will be contaminated by the plasticizer migrating into food.

The foregoing defect can be avoided by employing a polyester plasticizer (for instance, a polymer of a dibasic acid such as adipic acid, azelaic acid and sebacic acid with a glycol or glycerin) or a rubbery elastomer instead of the above-mentioned low molecular weight plasticizer. However, another defect is observed when using either of these latter mentioned plasticizers. In the case of the polyester plasticizer, the processability of the resin at the inflation film molding is not always good and it becomes brittle at low temperatures, with the result that sufficient strength is not obtained. In the case of the rubbery elastomer, its compatibility with vinylidene chloride series resin is generally poor. Hence, it is difficult to attain uniform blending and the transparency is frequently damaged. Furthermore, it is difficult to obtain a composition having high impact resistance at low temperatures when such rubbery elastomer is used.

Accordingly, a modifier for vinylidene chloride series resins is greatly needed which can impart to the vinylidene chloride series resin such advantageous properties as no exuding therefrom of the plasticizer when it is formed into a molded article, sufficient strength at low temperatures, and other excellent general properties inherent to polyvinylidene chloride such as good transparency, low water vapor permeability and low gas permeability.

The so-called MBS resins (graft copolymers obtained by polymerizing mainly methyl methacrylate and styrene in the presence of a diene type rubber) are commercially available as modifiers for vinyl chloride resins. They have been found to impart good impact resistance and improved processability to vinyl chloride resins. The inventors found that these MBS resins when used as modifiers for vinylidene chloride series resin can eliminate some of the above defects of vinylidene chloride resins.

Indeed, such MBS resins or ordinary MBS resins commercially available as modifiers for vinyl chloride resins, as illustrated in Examples given hereinbelow, can overcome some of the above defects, namely they can reduce the exuding of the plasticizer from a molded article and prevent sufficiently the vinylidene chloride resins article from becoming brittle at low temperatures, while also maintaining the water vapor permeability and gas permeability at low levels. However, it has been found that other especially troublesome defects are brought about by use of such MBS resins as modifiers. More specifically, formation of films is difficult under molding conditions heretofore adopted. The film surface smoothness is drastically damaged.

SUMMARY OF THE INVENTION

The inventors have discovered that the foregoing defects of vinylidene chloride series resins could be eliminated by blending vinylidene chloride series resins with a graft copolymer obtained by polymerizing aromatic vinyl compound, methyl methacrylate, acrylic acid ester and acrylonitrile in a rubbery latex.

It is possible to employ the graft polymer of this invention in combination with a low molecular weight plasticizer incorporated in such an amount so as to not cause exuding. Also, it is possible to obtain a vinylidene chloride series resin which is free of the above-mentioned defects and in which exuding of the plasticizer is hardly observed and in which brittleness is hardly brought about by low temperatures.

Use of an acrylic acid ester as a component of the polymer used as a modifier makes it possible to mold the vinylidene chloride series resin into a film without greatly changing molding conditions heretofore adopted for ordinary polyvinylidene chloride series resins. This feature is specifically disclosed in Example 2 in which flow characteristics of the graft polymer of this invention were measured.

As will be seen hereinbelow from the results of measurement of the softening temperature (Ts) and the flow beginning temperature (Tfb) as conducted by employing a Koka (the high polymer chemical institute) type flow tester according to the constant-rate temperature-elevating method, the graft polymer of this invention polymerized to contain an acrylic acid ester and acrylonitrile as branch components of graft polymer has much lower temperatures Ts and Tfb than commercially available MBS resins. Also, when such graft polymer was incorporated in a vinylidene chloride series resin, it exhibited good compatibility with the vinylidene chloride series resin. A vinylidene chloride series resin composition was obtained having flow characteristics resembling those of a vinylidene chloride resin composition having incorporated therein a conventional low molecular weight plasticizer. Furthermore, the inventive composition was readily molded into a smooth film without greatly changing the molding conditions conventionally adopted. Still further, it has been found that by use of an acrylic acid ester, it was possible for the modifier of this invention to increase the strength at low temperatures more greatly than conventional MBS resins.

As is apparent from the foregoing explanation, use of an acrylic acid ester as one of branch component is very effective for heightening the properties of the inventive graft polymer as a modifier for vinylidene chloride series resins.

Furthermore, use of acrylonitrile as a branch component is effective for improving compatibility of the inventive graft copolymer with a vinylidene chloride series resin and for improving transparency of the resulting vinylidene chloride series resin composition.

As regards the exuding of a plasticizer into a packaged foodstuff, it is desired that when a molded article is extracted in n-heptane at 120° F. for 30 minutes, the extraction ratio be less than 0.5%. In the case of a molded article of a vinylidene chloride series resin having incorporated therein a conventional low molecular weight plasticizer, the extraction ratio is about 1.5%. On the other hand, the extraction ratio can be lowered to less than 0.5% by employing a suitable amount of the graft polymer of this invention.

DETAILED DESCRIPTION OF PREFERRED EMBODIMENTS

A butadiene rubber is used in the form of an aqueous suspension formed by suspending it in water (hereinafter referred to as "rubber latex"). The term butadiene rubber includes butadiene homopolymers and copolymers of a major amount of butadiene with a minor amount of other monolefin monomer copolymerizable therewith, such as an aromatic vinyl compound, acrylonitrile and an acrylic acid ester. Such butadiene rubbers may be used singly or in the form of a mixture of two or more.

The butadiene rubber is used in an amount of 40 to 70 parts by weight based on 100 parts by weight of the sum of the butadiene rubber and the monomer mixture. In case the amount of the butadiene rubber is less than 40 parts by weight, the impact resistance of the resulting composition at low temperatures is poor. When the amount of the butadiene rubber is greater than 70 parts by weight, it is difficult to obtain a good transparency in the resulting composition, and it is also difficult to obtain a graft copolymer in powdery form, with the result that the graft copolymer cannot be blended uniformly with vinylidene chloride series resin. Further, when such composition is molded into a film, a good surface smoothness cannot be obtained.

The inventive modifier can be obtained by polymerizing 30 to 60 parts by weight of a monomer mixture having a specific monomer composition in the presence of the foregoing latex. An aromatic vinyl monomer, such as styrene and the like, is used in such monomer mixture. The amount of the aromatic vinyl compound is from 30 to 60% by weight based on the total monomer mixture. When the amount of aromatic vinyl compound is less than 30% by weight, the flow characteristics of the modifier are inferior and it is difficult to obtain a resin composition having sufficient film-moldability. In case the amount of aromatic vinyl compound is greater than 60% by weight, the strength of the resulting vinylidene chloride resin composition at low temperatures is very low.

Methyl methacrylate is used in the amount of from 10 to 40% by weight based on the total monomer mixture. When the amount of this monomer is less than 10% by weight, the blendability of the graft polymer with a vinylidene chloride series resin is lowered. When the amount of methyl methacrylate is greater than 40% by weight, the flowability of the resulting resin composition during molding operation is lowered. Also, it is difficult to obtain a resin composition having a good film-moldability. Moreover, there is reduction of the strength at low temperatures.

An acrylic acid ester is used in the monomer mixture for improving especially the film-moldability. In addition, as described above, this component imparts suitable flow characteristics to the polymer and is effective for improving strength at low temperatures. Any acrylic acid ester can be used in this invention, but use of the butyl ester is especially preferred. The acrylic acid ester is used in an amount of 10 to 40% by weight based on the total monomer mixture. In case the amount of the acrylic acid ester is less than 10% by weight, the above effects are not conspicuous. In case the acrylic acid ester is used in an amount exceeding 40% by weight, powderization of the resulting resin composition is difficult and troubles are brought about during the solidifying and drying steps. Therefore, the upper limit of 40% by weight is specified.

Acrylonitrile is used in an amount ranging from 5% by weight to 20% by weight based on the total monomer mixture for improving the blendability of the graft polymer with vinylidene chloride series resin. In case acrylonitrile is used in an amount exceeding the upper limit, it is difficult to obtain a molded article well balanced in properties. Especially, the surface smoothness is extremely poor when the resulting composition is molded into a film, and decomposition is observed during the molding operation.

The preparation of the modifier of this invention will now be described.

The polymerization may be carried out by emulsion polymerization. At first, a rubber latex is dispersed into an aqueous medium containing an emulsifier dissolved therein, and the dispersion is agitated. A polymerization initiator and other additives are incorporated in the thus formed dispersion. An agent for adjusting the degree of polymerization may be used. A mixture of the above monomers is added to the resulting composition and polymerized. Any polymerization initiator may be used in this invention. For example, it is possible to use organic and inorganic peroxides such as cumene hydroperoxide, tert-butyl hydroperoxide and ammonium persulfate, combinations of these peroxides with reducing agents such as formaldehyde sulfoxylates, and azobisisobutyronitrile and other initiators.

Tert-dodecyl mercaptan and the like may be used as an agent for adjusting the degree of polymerization. As an emulsifier an anionic surfactant may be used and according to need, a nonionic surfactant may be used.

The above-mentioned steps may be conducted in a nitrogen gas current under agitation at a polymerization temperature ranging from 30° C. to 80° C.

After termination of the polymerization, the latex is recovered and subjected to salting-out, filtration, water-washing and drying to obtain a graft polymer modifier.

A vinyl chloride series resin is blended and kneaded with the thus formed graft polymer modifier. Such vinylidene chloride series resins may include vinylidene chloride and a copolymer of vinylidene chloride comprising as the major component vinylidene chloride and one or more monomers copolymerizable therewith such as vinyl chloride, vinyl acetate and acrylonitrile. The intended resin composition can be obtained by blending the graft polymer and vinylidene chloride series resin. The blending may be conducted according to customary dry blending procedures.

The vinylidene chloride series resin composition incorporated with the modifier of this invention has the following advantages over a vinylidene chloride resin alone, or a vinylidene chloride resin incorporated with a plasticizer or a film molded therefrom:

(1) Improvement of the impact resistance at low temperatures is conspicuous.
(2) Processability, especially film-moldability, is greatly improved.
(3) When molded into a packaging film, no exuding of the plasticizer into a packaged article, is caused to occur.

A film of the vinylidene chloride series resin having incorporated therein the modifier of this invention, has an oxygen permeability ranging from $1 \times 10^{-12}$ to $2 \times 10^{-12}$ cc.cm./cm.$^2$.sec.cm. Hg, which value is lower than the value of the oxygen permeability of a film of a vinylidene chloride resin having a conventional low molecular weight plasticizer therein.

This invention will now be illustrated by reference to actual examples.

EXAMPLE 1

A glass polymerization vessel was charged with 55 parts by weight of a butadiene rubber latex having a styrene content of 25% by weight and 200 parts by weight of water, and the temperature of the charge was raised to 60° C. Then, 0.005 part by weight of EDTA (ethylenediamine tetraacetate)-ferrus sulfate and 0.2 part by weight of sodium formaldehyde sulfoxylate were added to the charge. A mixture of 10 parts by weight of methyl methacrylate, 18 parts by weight of styrene, 12 parts by weight of butyl acrylate, 5 parts by weight of acrylonitrile and 0.4 part by weight of cumene hydroperoxide was incorporated continuously into the charge of the vessel for 5 hours to effect the polymerization. The resulting latex was salted out, filtered and dried according to customary procedures to obtain a powdery graft polymer (sample 1). Similarly, the following graft polymers differing in the monomer composition were prepared; namely a graft copolymer in which the butyl acrylate content was low and the methyl methacrylate content was high (sample 2), a graft polymer in which the acrylonitrile content was high (sample 3), and a graft polymer in whcih the content of the butyl acrylate was extremely increased (sample 4). For comparison, MBS resin modifiers for vinyl chloride resins (samples 5 and 6) are shown in Table 1. With respect to each of samples 1 to 4, the monomer composition is shown in Table 1. Samples 5 and 6 did not contain an acrylic acid ester.

The flow characteristics of these graft polymers were measured by employing a Koka type flow tester, and values of $Ts$ and $Tfb$ are shown in Table 1.

From the results shown in Table 1, it is seen that the flow characteristics at low temperatures were improved by use of the acrylic acid ester. The graft polymer modifier of this invention is characterized in that it can flow at a much lower temperature than commercially available, conventional MBS resin modifiers for vinyl chloride resins and has $Ts$ of lower than 60° C. and $Tfb$ of lower than 100° C. in fact, each property of the resulting film was improved by use of the acrylic acid ester. In other words, the vinylidene chloride resin composition having incorporated therein the graft polymer of this invention has flow characteristics very close to those of a conventional vinylidene chloride resin composition incorporated with a great quantity of a low molecular weight plasticizer. It is apparent that the presence of the acrylic acid ester is one of the factors which improve the processability of the resin composition at the film-molding operation.

The flow characteristics of vinylidene chloride resins (samples 7, 8 and 9) are shown in Table 2.

Sample 2 in which the butyl acrylate content was low and the methyl methacrylate content was high, was poor in flow characteristics and did not exhibit good processability. Sample 3 in which the butyl acrylate content was low and the acrylonitrile content was high exhibited good flow characteristics but was not well-balanced in other properties.

Sample 4 in which the butyl acrylate content was extremely heightened was defective in that it was very difficult to obtain a powdery resin from the latex and homogeneous blending with the vinylidene chloride resin could not be attained.

From the foregoing, it is apparent that the presence of a suitable amount of an acrylic acid ester gives an excellent modifier for vinylidene chloride resins.

TABLE 1

| Sample No. | Monomer composition [1] (parts by weight) | | | | Flow characteristics measured by Koka type flow tester [2] | | Processability | Ratio of breakage at low temperature (percent) | Extraction ratio (percent) | Transparency | Surface smoothness |
|---|---|---|---|---|---|---|---|---|---|---|---|
| | MMA | St | BA | AN | $Ts$ (° C.) | $Tfb$ (° C.) | | | | | |
| Sample of this invention: | | | | | | | | | | | |
| 1 | 10 | 18 | 12 | 5 | 41 | 80 | ⊚ | 12 | 0.4 | ○ | ○ |
| 2 | 30 | 11 | 4 | 0 | 55 | 101 | △ | 78 | 0.5 | ○ | ○ |
| 3 | 8 | 18 | 4 | 15 | 33 | 75 | X | 48 | | X | ○ |
| 4 | 0 | 18 | 22 | 5 | <30 | 60 | | | | | |
| Comparative samples: | | | | | | | | | | | |
| 5 | Commercially available product MBS-1 (neither BA nor AN detected). | | | | 70 | 128 | X | 45 | 0.5 | △ | X |
| 6 | Commercially available product MBS-2 (neither BA nor AN detected). | | | | 65 | 129 | △ | 30 | 0.5 | ○ | △ |

NOTES.—(For all tables):
[1] Monomer composition: MMA=methyl methacrylate; St=styrene; BA=butyl acrylate; AN=acrylonitrile.
[2] Measurement of $Ts$ (softening temperature) and $Tfb$ (flow beginning temperature) by Koka type flow tester: 100 kg. load; 1.5 g. of powdery sample; temperature-elevating rate of 6° C./min.; nozzle diameter of 1 mm.; nozzle length of 1 mm.
[3] X=inferior. △=somewhat inferior. ○=good. ⊚=very excellent. XX=very inferior. ○△=quality between circle and triangle.

Properties of films prepared by inflation molding a composition obtained by incorporating 10 parts by weight of the graft polymer into 100 parts by weight of a vinylidene chloride resin together with 1 part by weight of epoxidized soybean oil and 5 parts of dibutyl sebacate were evaluated and shown in Table 1. The film thickness was 35 to 40μ.

The processability at the molding operation was evaluated qualitatively. The ratio of breakage at low temperatures was determined by the following method; namely, tube-like film samples packed with water were allowed to fall down at 2° C. and numbers of broken samples and unbroken samples were calculated. The ratio of breakage at low temperatures is expressed in terms of the percent of the number of broken samples based on the number of the total samples.

The extraction ratio was determined according to the method described hereinabove, and the surface smoothness and transparency were evaluated by naked eye observation.

TABLE 2

| Sample No. | Composition | Flow characteristics measured by Koka type flow tester | |
|---|---|---|---|
| | | $Ts$ (° C.) | $Tfb$ (° C.) |
| Comparative sample: | | | |
| 7 | 100 parts of vinylidene chloride resin. | 131 | 143 |
| 8 | 100 parts of vinylidene chloride resin plus 10 parts of dioctyl adipate. | 90 | 115 |
| 9 | 100 parts of vinylidene chloride resin plus 15 parts of dibutyl sebacate. | 55 | 102 |

EXAMPLE 2

Properties of the polyviinylidene resin composition having incorporated therein the graft polymer sample 1 prepared in Example 1 and indicated in Table 1 and those of comparative sample 1 obtained by employing 15 parts by weight of dibutyl sebacate (ordinary vinylidene chloride resin composition) and comparative sample 2 (the same composition as in Example 1 except that the graft polymer was not added) are shown in Table 3.

From the results shown in Table 3 it is apparent that use of a suitable amount of the graft polymer of this invention in combination with a small amount of a plasticizer can reduce the heptane extraction ratio greatly as compared with the case of the conventional resin composition (comparative sample 1) and the low temperature strength can be retained sufficiently without degradation of the film-forming property and transparency.

It is also seen that in case the graft polymer is not used and the amount of the plasticizer is decreased (comparative sample 2), the low temperature strength and film-forming property are drastically lowered though the extraction ratio is reduced.

The foregoing description is intended to be only illustrative of the principles of this invention. Numerous variations and modifications thereof would be apparent to one skilled in the art. All such variations and modifications are to be considered to be within the spirit and scope of this invention.

What is claimed is:

1. A composition consisting essentially of a blend of vinylidene chloride series resin and polymer obtained by polymerizing 40 to 70 parts by weight butadiene homopolymer or copolymer, and 30 to 60 parts by weight monomer mixture consisting essentially of 30 to 60 weight percent styrene, 10 to 40 weight percent methyl methacrylate,

TABLE 3

| Sample | Substances to be incorporated in 100 parts of vinylidene chloride resin and their amounts (parts) | Film-forming property | Ratio of breakage at low temperature (percent) | Extraction ratio (percent) | Transparency (evaluated according to naked eye observation) |
|---|---|---|---|---|---|
| Sample of this invention | 10 parts of graft polymer sample 1 shown in Table 1, 5 parts of dibutyl sebacate and 1 part of epoxidized soybean oil | ◎ | 12 | 0.4 | ◎ |
| Comparative Sample 1 | 15 parts of dibutyl sebacate and 1 part of epoxidized soybean oil | ◎ | 15 | 1.5 | ◎ |
| Comparative Sample 2 | 5 parts of dibutyl sebacate and 1 part of epoxidized soybean oil | X | 100 | 0.4 | ◎ |

EXAMPLE 3

Graft polymers were synthesized by varying the amount of the rubber latex to obtain samples 10, 11 and 12 and 13, properties of which are shown in Table 4.

As is seen from these results, when the amount of the rubber used is small, the ratio of breakage at low temperatures is high and a vinylidene chloride resin composition of practical value cannot be obtained. When the amount of the rubber used is too great, the film-moldability is degraded and reduction of other properties is brought about. Thus, in view of these results, it is considered that a suitable amount of the rubber in the graft polymer is 40 to 70 parts by weight based on 100 parts by weight of the graft polymer.

10 to 40 weight percent butyl acrylate, and 5 to 20 weight percent acrylonitrile.

2. The composition of claim 1, wherein said polymerization is emulsion polymerization.

3. The composition of claim 1, wherein said vinylidene chloride series resin is selected from the group consisting of vinylidene chloride and copolymers thereof.

4. The composition of claim 1, wherein said composition has an oxygen permeability ranging from $1 \times 10^{-2}$ to $2 \times 10^{-12}$ cc.cm./cm.$^2$.sec.cm. Hg.

5. The composition of claim 1, wherein cumene hydroperoxide is added during polymerization.

TABLE 4

| Sample No. | Amount of rubber (parts) | Monomer composition (parts) | | | | Test by Koka type flow tester | | Processability | Properties of film | | |
|---|---|---|---|---|---|---|---|---|---|---|---|
| | | MMA | ST | BA | AN | Ts (°C.) | Tfb (°C.) | | Ratio of breakage at low temperature (percent) | Transparency | Surface smoothness |
| 10 (comparison) | 24 | 33 | 33 | 5 | 5 | 80 | 138 | ○ | 98 | ○ | △ |
| 11 (this invention) | 42 | 23 | 25 | 5 | 5 | 66 | 124 | ○ | 84 | ○ | ○ |
| 12 (this invention) | 55 | 10 | 18 | 12 | 5 | 41 | 80 | ◎ | 12 | ○ | ○ |
| 13 (comparison) | 75 | 6 | 10 | 5 | 3 | 57 | 104 | XX | | X | X |

EXAMPLE 4

Graft polymers were synthesized by increasing the amounts of methyl methacrylate, styrene and acrylonitrile without changing the amount of butyl acrylate. Properties of these graft polymers are shown in Table 5.

From the results shown in Table 5, the following can be seen.

Increase of the amount of methyl methacrylate results in reduction of the flowability and gives bad influences to the processability.

Increase of the amount of styrene results in undesired increase of brittleness at low temperatures.

Increase of the amount of acrylonitrile results especially in degradation of the film surface smoothness.

6. Composition of claim 1, consisting essentially of polyvinylidene chloride resin and said graft copolymer and less than 50 weight percent, based on said graft copolymer, of plasticizer selected from the group consisting of dioctyl phthalate, dibutyl sebacate, acetyl tributyl citrate, ethyl phtholyl ethyl glycolate, alpha chloro naphthalene and epoxidized soybean oil.

7. The composition of claim 1 wherein said methyl methacrylate is from 17.8 to 22.2 weight percent; said acrylonitrile is from 11.1 to 33.3 weight percent; said aromatic vinyl compound is styrene and is in an amount of from 30 to 40 weight percent, and said acrylic acid ester

TABLE 5

| Sample No. | Monomer composition (parts by weight) | | | | Flow test | | Processability | Ratio of breakage at low temperature (percent) | Extraction ratio (percent) | Transparency | Surface smoothness |
|---|---|---|---|---|---|---|---|---|---|---|---|
| | MMA | St | BA | AN | Ts (°C.) | Tfb (°C.) | | | | | |
| 14 (comparison) | 25 | 3 | 12 | 5 | 65 | 118 | △ | 78 | | ○ | ○ |
| 15 (comparison) | 0 | 68 | 12 | 5 | 40 | 71 | ○ | 74 | 0.6 | ○ | △ |
| 16 (this invention) | 10 | 18 | 12 | 5 | 41 | 80 | ◎ | 12 | 0.4 | ○ | ○ |
| 17 (comparison) | 0 | 18 | 12 | 15 | 50 | 96 | ○ | 15 | 0.5 | X | X | is butyl acrylate and is in an amount of from 10 to 26.6 weight percent.

References Cited
UNITED STATES PATENTS

| | | | |
|---|---|---|---|
| 3,671,610 | 6/1972 | Amagi et al. | 260—876 R |
| 3,671,607 | 6/1972 | Lee | 260—876 R |
| 3,657,391 | 4/1972 | Curfman | 260—876 R |
| 3,676,527 | 5/1972 | Babcock | 260—876 R |

OTHER REFERENCES

"Rubber World," 1968, p. 204.

HOSEA E. TAYLOR, Primary Examiner

W. E. PARKER, Assistant Examiner

U.S. Cl. X.R.

260—876 R